(12) United States Patent
Hwangbo et al.

(10) Patent No.: US 11,814,004 B2
(45) Date of Patent: Nov. 14, 2023

(54) SIDE AIR BAG FOR VEHICLE

(71) Applicant: HYUNDAI MOBIS CO., LTD., Seoul (KR)

(72) Inventors: Sang Won Hwangbo, Yongin-si (KR); Choong Ryung Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/242,234

(22) Filed: Apr. 27, 2021

(65) Prior Publication Data

US 2021/0362670 A1  Nov. 25, 2021

(30) Foreign Application Priority Data

May 22, 2020  (KR) .................. 10-2020-0061829

(51) Int. Cl.
 *B60R 21/231* (2011.01)
 *B60R 21/207* (2006.01)
 *B60R 21/26* (2011.01)
 *B60R 21/00* (2006.01)

(52) U.S. Cl.
 CPC ...... *B60R 21/23138* (2013.01); *B60R 21/207* (2013.01); *B60R 21/26* (2013.01); *B60R 2021/0006* (2013.01); *B60R 2021/23146* (2013.01)

(58) Field of Classification Search
 None
 See application file for complete search history.

(56) References Cited

U.S. PATENT DOCUMENTS

| | | | |
|---|---|---|---|
| 8,851,511 B1 | 10/2014 | Volkmann | |
| 9,994,181 B1 * | 6/2018 | Dubaisi | B60R 21/207 |
| 10,336,283 B2 * | 7/2019 | Rickenbach | B60R 21/233 |
| 10,875,486 B2 * | 12/2020 | Kim | B60R 21/23138 |
| 2006/0131847 A1 * | 6/2006 | Sato | B60R 21/23138 |
| | | | 280/730.2 |
| 2018/0326938 A1 | 11/2018 | Rickenbach | |
| 2019/0054890 A1 * | 2/2019 | Kwon | B60R 21/233 |
| 2019/0299903 A1 | 10/2019 | Nagasawa | |
| 2020/0189514 A1 * | 6/2020 | Yoo | B60N 2/79 |
| 2021/0179009 A1 * | 6/2021 | Lee | B60R 21/233 |
| 2021/0245699 A1 * | 8/2021 | Adler | B60R 21/213 |

(Continued)

FOREIGN PATENT DOCUMENTS

| | | |
|---|---|---|
| CN | 101032950 | 9/2007 |
| CN | 102729942 | 10/2012 |

(Continued)

OTHER PUBLICATIONS

Extended European Search Report dated Aug. 3, 2021 issued in EP 21172281.4.

(Continued)

*Primary Examiner* — Faye M Fleming
(74) *Attorney, Agent, or Firm* — DLA PIPER LLP (US)

(57) ABSTRACT

A side airbag for a vehicle including an inflator part that discharges an inflation gas; and a cushion part that covers the inflator part, is deployed by the gas discharged from the inflator part. The cushion part includes a main chamber part deployed between a passenger and a vehicle body, and a protruding chamber part extended from the main chamber part and deployed in front of the passenger.

8 Claims, 5 Drawing Sheets

(56) References Cited

U.S. PATENT DOCUMENTS

2021/0354653 A1* 11/2021 Lee .................. B60R 21/233
2021/0402949 A1* 12/2021 Sung ............... B60R 21/23138

FOREIGN PATENT DOCUMENTS

| DE | 102020103916 A1 * | 8/2021 | |
| JP | 2019-137307 | 8/2019 | |
| KR | 20200075065 A * | 6/2020 | ........... B60R 21/233 |
| KR | 20200141727 A * | 7/2020 | |
| WO | WO 2014/197378 | 12/2014 | |
| WO | WO-2020141737 A1 * | 7/2020 | |
| WO | WO-2022008403 A1 * | 1/2022 | |
| WO | WO-2022008406 A1 * | 1/2022 | |

OTHER PUBLICATIONS

European Office Action dated Aug. 18, 2021 issued in EP 21172281.4.
Chinese Office Action dated Jun. 10, 2023 issued in CN 2021105571485.
English Language Abstract of JP 2019-137307 published Aug. 22, 2019.
English Language Abstract of CN 102729942 published Oct. 17, 2012.
English Language Abstract of CN 101032950 published Sep. 27, 2007.

* cited by examiner

SIDE AIR BAG FOR VEHICLE

CROSS REFERENCE TO RELATED APPLICATION

The present application claims priority to Korean Patent Application No. 10-2020-0061829, filed May 22, 2020, the entire contents of which is incorporated herein for all purposes by this reference.

BACKGROUND

Technical Field

The present invention relates to a side airbag of vehicle, and more particularly, a side airbag capable of effectively protecting a passenger even in autonomous driving with a high degree of freedom such as seat position/sitting by enabling the restriction of the forward behavior of a passenger seated in a vehicle seat.

Description of the Related Art

In general, a side airbag of vehicle is an apparatus provided to protect the side of a passenger, and in the event of vehicle accident, an airbag cushion is inflated by an introduced gas, and the inflated airbag cushion protects the passenger moving to the side by a cushioning action.

The side airbag of vehicle can be configured with a near side airbag that, in the event of a side collision, deploys between a passenger and the vehicle's side body, for example, between doors, to protect the passenger and a far side airbag that restricts the movement of the passenger moving inside the vehicle due to side collision recoil.

A conventional side airbag has a structure for protecting a passenger from the side impact of a vehicle by simply deploying on the side of a seat in a state in which all the seats of the vehicle face the front of the vehicle, Therefore, in a vehicle capable of autonomous driving in three or more stages with high degrees of freedom in the seat position and direction and the seating position of the passenger, it is difficult to effectively protect the passenger with the side airbag deployed to the side of the vehicle depending on the seat position or direction and the seating position of the passenger.

For example, if an impact is applied to the side of the vehicle while the passenger adjusts the direction of the passenger seat to face the driver's seat, the passenger seated in the passenger seat is impacted in the front and rear directions of the body. Thus, even if the conventional side airbag is deployed, there is a problem that the passenger seated in the passenger seat cannot be safely protected.

The matters described as the background art are only for enhancing an understanding of the background of the present invention, and should not be taken as acknowledging that they correspond to the prior art already known to those of ordinary skill in the art.

SUMMARY

An object of the present invention is to provide a side airbag for vehicle that can safely protect a passenger by restricting the forward behavior of the passenger seated on a seat even when the position or direction of the seat is changed in various ways, such as in an autonomous vehicle of three or more stages.

According to an exemplary embodiment of the present invention, a side airbag for vehicle including: an inflator part that discharges an inflation gas; and a cushion part that covers the inflator part, and is deployed by the gas discharged from the inflator part, wherein the cushion part includes a main chamber part that is deployed between a passenger and a vehicle body, and a protruding chamber part that extends from the main chamber part and is deployed in front of the passenger.

The protruding chamber part may be bent or rolled in a direction in which the passenger is located.

The protruding chamber part of the cushion part installed on a left side of a seat may be bent or rolled in a clockwise direction from an upper viewpoint, and the protruding chamber part installed on a right side of the seat may be bent or rolled in a counterclockwise direction from the upper viewpoint.

In a state in which the protruding chamber part is bent or rolled, a part of an outer surface of the protruding chamber part may be fixed to an outer surface of the cushion part.

An inactive zone through which the discharge gas does not penetrate may be formed in a vertical direction at a center of the main chamber part so that the discharge gas is transmitted to lower and upper portions of the main chamber part.

A gas discharge part of the inflator part may be disposed to face the lower portion of the main chamber part.

The inflation gas discharged from the inflator part may flow to a lower portion of the main chamber part, an upper portion of the main chamber part, and the protruding chamber part.

The protruding chamber part may be extended at a height corresponding to a chest part from an upper part of an abdomen of the passenger.

The main chamber part may extend from a pelvis of the passenger to a height of a head of the passenger.

According to another exemplary embodiment of the present invention, a side airbag for vehicle which is deployed to a side of a seat, including: an inflator part that is installed on a frame of the seat and discharges an inflation gas; and a cushion part that covers the inflator part, is deployed by the gas discharged from the inflator part, and includes a main chamber part disposed between a passenger and a vehicle body in a deployed state, and a protruding chamber part extended from the main chamber part and disposed in front of the passenger seated on the seat during deployment, wherein the protruding chamber part has a shape that is bent or rolled in a direction in which the passenger is positioned when deployed, and a part of an outer surface of the protruding chamber part is fixed to an outer surface of the cushion part; and wherein the main chamber part has an inactive zone through which the discharge gas does not penetrate is formed in a vertical direction at a center of the main chamber part so that the discharge gas is transmitted to lower and upper portions of the main chamber part, so that the inflation gas discharged from the inflator part flows to the lower portion of the main chamber part, the upper portion of the main chamber part, and the protruding chamber part.

According to the side airbag for vehicle, since it is provided a cushion part including a protruding chamber part that is deployed in front of a passenger from a side of a seat, there is an effect that can protect the passenger safely by restricting the forward behavior of the passenger seated on the seat even in a vehicle with three or more stages of autonomous driving, where the seat position or direction can be freely changed.

DETAILED DESCRIPTION OF THE EMBODIMENTS

Figure 1:
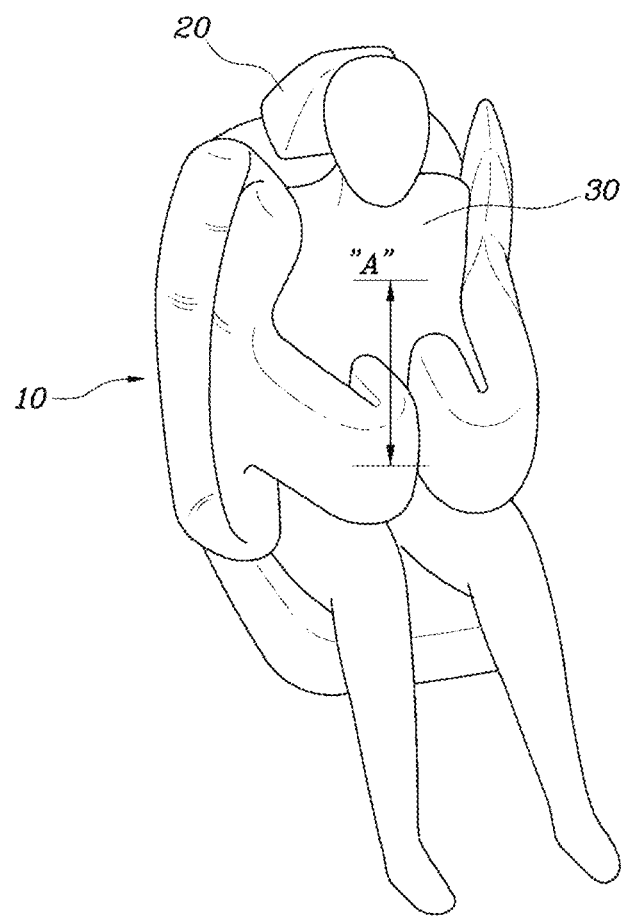
FIG. 1 is a perspective view showing a state of a seat and a passenger in which a side airbag for vehicle according to an embodiment of the present invention is deployed.

Specific structural or functional descriptions of the embodiments of the present invention disclosed in this specification or application are exemplified only for the purpose of describing the embodiments according to the present invention, and the embodiments according to the present invention may be implemented in various ways and should not be construed as being limited to the embodiments described in this specification or application.

Since the embodiments according to the present invention can be modified in various ways and have various forms, specific embodiments are illustrated in the drawings and will be described in detail in the present specification or application. However, this is not intended to limit the embodiments according to the concept of the present invention to a specific form disclosed, and it should be understood to include all changes, equivalents, and substitutes included in the spirit and scope of the present invention.

Terms such as first and second may be used to describe various components, but the components should not be limited by the terms. The above terms are only for the purpose of distinguishing one component from other components, for example, without departing from the scope of the rights according to the concept of the present invention, the first component may be referred to as the second component, and similarly the second component may also be referred to as a first component.

When a component is referred to as being "connected" or "contacted" to another component, it should be understood that it may be directly connected or contacted to the other component, but other components may exist in the middle. On the other hand, when a component is referred to as being "directly connected" or "directly contacted" to another component, it should be understood that there is no other component in the middle. Other expressions describing the relationship between components, such as "between" and "just between" or "adjacent to" and "directly adjacent to" should be interpreted as well.

The terms used in the present specification are only used to describe specific embodiments, and are not intended to limit the present invention. Singular expressions include plural expressions unless the context clearly indicates otherwise. In the present specification, terms such as "comprise" or "have" are intended to designate the existence of a specified feature, number, step, action, component, part, or combination thereof, and are understood that the presence or addition of one or more other features or numbers, steps, actions, elements, parts, or combinations thereof is not preliminarily excluded.

Unless otherwise defined, all terms used herein, including technical or scientific terms, have the same meaning as commonly understood by one of ordinary skill in the art to which the present invention belongs. Terms such as those defined in commonly used dictionaries should be interpreted as having meanings consistent with the meanings of the related technology, and should not be interpreted as ideal or excessively formal meanings unless explicitly defined in the present specification.

Hereinafter, a side airbag of vehicle according to various embodiments will be described in detail with reference to the accompanying drawings.

Figure 2:
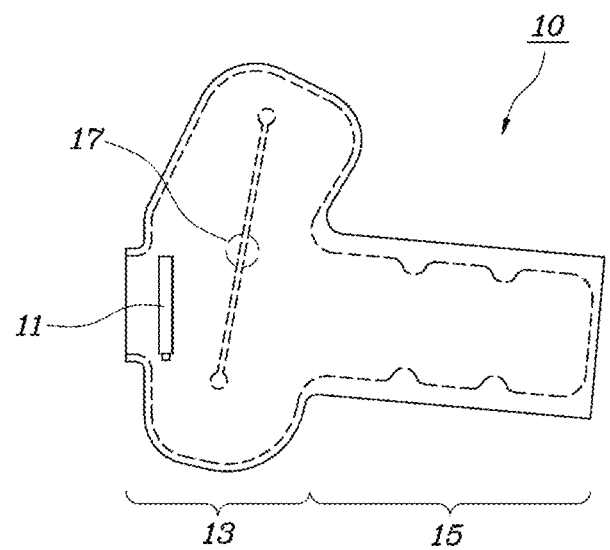
FIG. 2 is a side view of a side airbag for vehicle according to an embodiment of the present invention.
Figure 2:
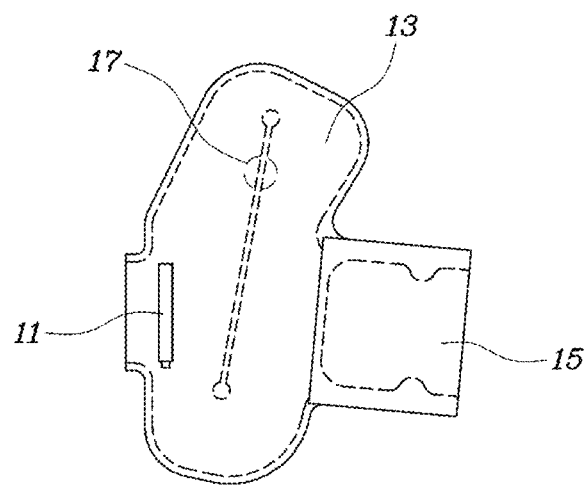
Figure 3:
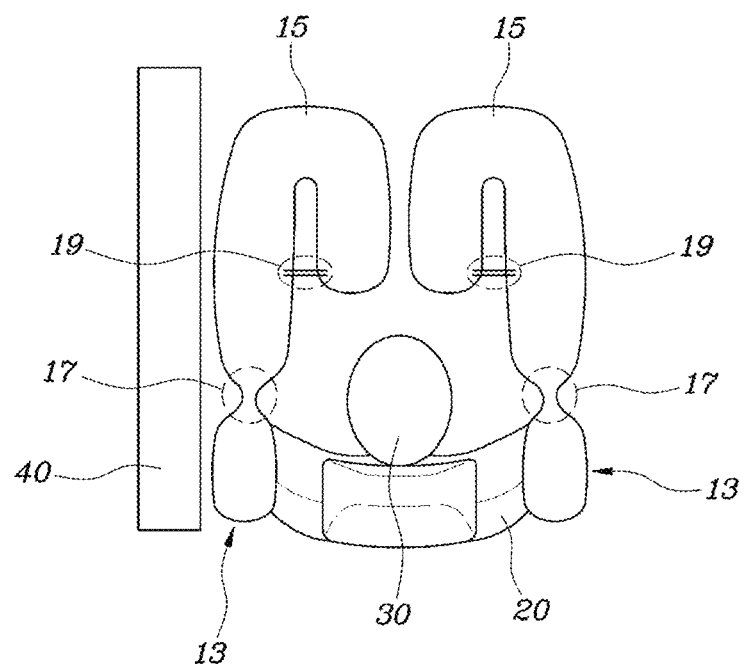
FIGS. 3 and 4 are plan views showing a state in which a side airbag for vehicle according to various embodiments of the present invention is deployed.
Figure 4:
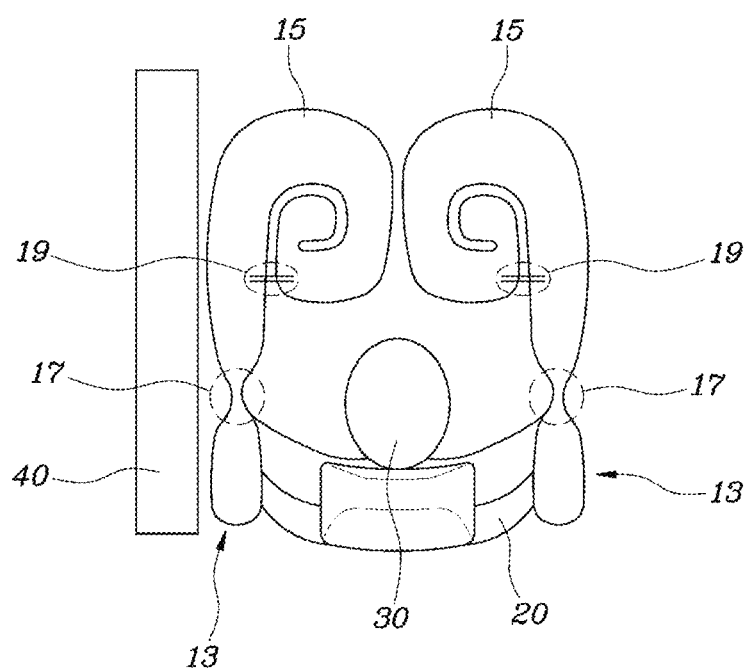

FIG. 1 is a perspective view showing a state of a seat and a passenger in which a side airbag for vehicle according to an embodiment of the present invention is deployed. FIG. 2 is a side view of a side airbag for vehicle according to an embodiment of the present invention. FIGS. 3 and 4 are plan views showing a state in which a side airbag for vehicle according to various embodiments of the present invention is deployed.

Referring to FIGS. 1 to 4, a side airbag for vehicle 10 according to an embodiment of the present invention may be configured to include an inflator part 11 and cushion parts 13 and 15.

The inflator part 11 may be installed on a frame part of a seat, not shown. The frame part of the seat is mainly made of a metal material, and a seat cushion is covered over it, so that the seat on which a passenger can sit may be completed. The inflator part 11 may be installed on the seat frame of all or some seats in the vehicle.

The cushion parts 13 and 15 cover the inflator part 11 and are deployed by the gas discharged from the inflator part 11 to protect the side and front of the passenger. For example, the cushion parts 13 and 15 are coupled to the inflator part 11, overlap before discharging the gas, and are embedded in the seat cushion. Thus, when gas is discharged from the inflator part 11, it may be deployed to tear the seat cushion and protrude to the outside.

The cushion part 13 according to an embodiment of the present invention may include a main chamber part 13 that is mainly disposed on the side portion of a seat 20 in a deployed state to protect the side of the passenger and a protruding chamber part 15 that extends from the main chamber part 13 to the front of the passenger.

The main chamber part 13 is a chamber that is deployed between the passenger and the side body of the vehicle in a normal seat arrangement. That is, when a vehicle impact is detected by an impact sensor during a vehicle side collision and gas is discharged from the inflator part 11, it is a chamber that is deployed between the vehicle side body and the passenger to protect the side portion of the passenger.

The main chamber part 13 mainly serves to protect the passenger's pelvis, but when the end of the main chamber part 13 extends to the height of the passengers head, it can protect not only the pelvis but also the shoulders and head of the passenger.

The protruding chamber part 15 may be formed at one end of the main chamber part 13. That is, the protruding chamber part 15 may be formed to extend from one end of the main chamber part 13 to the front of the passenger.

Since various embodiments of the present invention include a protruding chamber part 15 that is developed from the side of the seat to the front of the passenger, it is possible to safely protect the passenger by restricting the forward behavior of the passenger seated on the seat even in vehicles with three or more stages of autonomous driving, where the position or direction of the seat can be freely changed to the side of the vehicle or the rear of the vehicle rather than the front.

In more detail, as shown in the upper part of FIG. 2, the protruding chamber part 15 may have a shape extending in a straight line from the main chamber part 13, but when it is actually installed, as shown in the lower part of FIG. 2, FIG. 3, and FIG. 4, by bending or rolling in the direction of the passenger, the protruding chamber part 15 having a predetermined thickness may be disposed in front of the passenger 30 when the airbag is deployed. That is, when the protruding chamber part provided on the left side of the seat is deployed, it may be a bent or rolled shape in a clockwise direction from the upper viewpoint, and when the protruding chamber part provided on the right side of the seat is deployed, it may be a bent or rolled shape in a counterclockwise direction from the upper viewpoint.

The structure of the protruding chamber part 15 itself may be manufactured to be formed to have a certain thickness or more in front of the passenger without separate bending or rolling, but for the following reasons, it is desirable to achieve the arrangement structure of the cushion part in front of the passenger of a certain thickness by bending or rolling.

When the air bag is deployed, the cushion part needs to have rigidity in order to restrict the behavior of the passenger, and in order to secure such rigidity, the cushion part needs to be manufactured so that internal pressure is not lost. To this end, the cushion part composed of the main chamber part 13 and the protruding chamber part 15 is preferably manufactured by a manufacturing method such as One Piece Woven (OPW), Cut & Sew Sealant, etc.

When applying such a cushion part manufacturing method, the cushion part should be a 2-Panel cushion with two panels. In order to implement the protruding chamber part 15 with a 2-Panel cushion, it is preferable to use a method in which the front of the protruding chamber part 15 is bent or rolled, and it fixes to an outer surface of the cushion part facing a part of the outer surface of the bent or rolled part of the protruding chamber part, so that the thickness of the cushion part disposed in front of the passenger is increased.

As described above, the side airbag for vehicle according to various embodiments of the present invention forms the cushion part having a sufficient thickness to restrict the forward movement of the passenger through the structure in which the protruding chamber part 15 is bent or rolled, Therefore, even in a vehicle to which three or more stages of autonomous driving in which the position or direction of the seat can be freely changed is applied, passenger safety can be further improved by sufficiently restricting the forward behavior of the passenger seated on the seat.

On the other hand, the position of the protruding chamber part 15 in the state in which the airbag is deployed is preferably positioned on the chest A from the upper abdomen of the passenger. This is to effectively restrict the passenger's forward behavior by wrapping the upper part of the upper body of the passenger 30 with the protruding chamber part 15.

In another embodiment, the protruding chamber part 15 may be designed to be deployed to a height corresponding to the head of the passenger 30. In the embodiment in which the protruding chamber part 15 is extended to the head of the passenger, safety can be further improved by restricting the forward movement of the head, which is most important in the body.

In addition, in various embodiments of the present invention, the position of a gas discharge part 111 from which the inflated gas is discharged from the inflator part 11 is appropriately determined in consideration of the position of a vehicle body 40, the passenger 30, thereby further improving the passenger protection effect by the side airbag.

Figure 5:
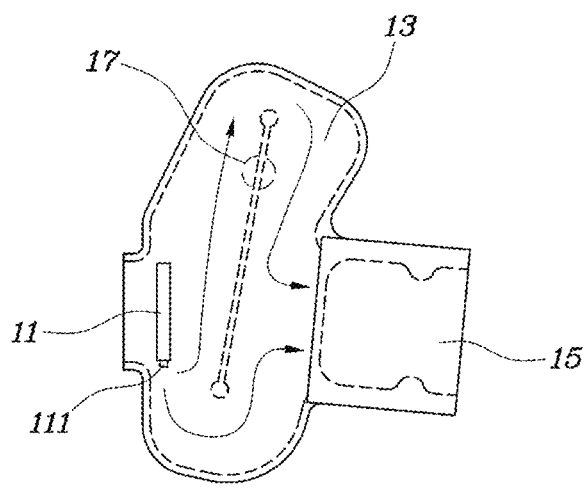
FIG. 5 is a view for explaining a direction of discharge gas flow of a side airbag for vehicle according to an embodiment of the present invention.

FIG. 5 is a view for explaining a direction of discharge gas flow of a side airbag for vehicle according to an embodiment of the present invention.

Referring to FIG. 5, when the air bag is deployed, the inflation gas preferably flows in the order of the inflator 11→the lower portion of the main chamber part 13→the upper portion of the main chamber part 13→the protruding chamber part 15.

In the general case where the seats of the vehicle are all arranged toward the front like a conventional vehicle, the main chamber part 13, rather than the protruding chamber part 15, is preferably first deployed because the time when the vehicle body touches the passenger by the side collision is shorter than the time when the vehicle body touches the passenger by the frontal collision. In addition, it is preferable to first deploy the lower portion of the main chamber part 13 corresponding to the pelvis part and then deploy the upper portion thereafter in order to protect the pelvis part of the passenger 30 first.

In order to make such inflation gas flow, the direction of the gas discharge part 111 of the inflator part 11 is preferably disposed toward the lower portion of the main chamber part 13, and in order to make the gas flow path from the lower portion to the upper portion, an inactive zone 17 through which the discharge gas does not pass may be formed in a vertical direction in the center of the main chamber part 13.

Since a separate separator cannot be sewn inside the cushion part which is manufactured by a one-piece woven or cut-and-saw sealant method, the inactive zone 17 can be formed by sewing two panels from the outside.

As described above, according to an embodiment of the present invention, a flow path of the inflation gas is formed to first protect the pelvis of a passenger to which the impact can be transmitted first, so that in the event of vehicle collision, the injury to the passenger can be minimized.

Although the present invention has been illustrated and described in connection with specific embodiments, it will be obvious to those of skilled in the art that the present invention can be variously improved and changed within the scope of the technical spirit of the present invention provided by the following claims.

What is claimed is:

1. A side airbag for vehicle comprising:
an inflator part that discharges an inflation gas; and
a cushion part that covers the inflator part, and is deployed by the gas discharged from the inflator part,
wherein the cushion part includes a main chamber part that is adapted to be deployed between a passenger and a vehicle body, and a protruding chamber part that extends from the main chamber part and is adapted to be deployed in front of the passenger;
wherein the protruding chamber part is adapted to be rolled in a direction in which the passenger is located; and
wherein the protruding chamber part of the cushion part installed on a left side of a seat is rolled in a clockwise direction from an upper viewpoint, and the protruding chamber part installed on a right side of the seat is rolled in a counterclockwise direction from the upper viewpoint.

2. The side airbag of claim 1,
wherein in a state in which the protruding chamber part is rolled, a part of an outer surface of the protruding chamber part is fixed to an outer surface of the cushion part.

3. The side airbag of claim 1,
wherein an inactive zone through which the discharge gas does not penetrate is formed in a vertical direction at a center of the main chamber part so that the discharge gas is transmitted to lower and upper portions of the main chamber part.

4. The side airbag of claim 3,
wherein a gas discharge part of the inflator part is disposed to face the lower portion of the main chamber part.

5. The side airbag of claim 1,
wherein the inflation gas discharged from the inflator part flows to a lower portion of the main chamber part, an upper portion of the main chamber part, and the protruding chamber part.

6. The side airbag of claim 1,
wherein the protruding chamber part is adapted to be extended at a height corresponding to a chest part from an upper part of an abdomen of the passenger.

7. The side airbag of claim 1,
wherein the main chamber part is adapted to extend from a pelvis of the passenger to a height of a head of the passenger.

8. A side airbag for vehicle which is deployed to a side of a seat, comprising:
an inflator part that is installed on a frame of the seat and discharges an inflation gas; and
a cushion part that covers the inflator part, is deployed by the gas discharged from the inflator part, and includes a main chamber part adapted to be disposed between a passenger and a vehicle body in a deployed state, and a protruding chamber part extended from the main chamber part and adapted to be disposed in front of the passenger seated on the seat during deployment,
wherein the protruding chamber part has a shape that is adapted to be rolled in a direction in which the passenger is positioned when deployed, and a part of an outer surface of the protruding chamber part is fixed to an outer surface of the cushion part;
wherein the protruding chamber part of the cushion part installed on a left side of a seat is rolled in a clockwise direction from an upper viewpoint, and the protruding chamber part installed on a right side of the seat is rolled in a counterclockwise direction from the upper viewpoint; and
wherein the main chamber part has an inactive zone through which the discharge gas does not penetrate is formed in a vertical direction at a center of the main chamber part so that the discharge gas is transmitted to lower and upper portions of the main chamber part, so that the inflation gas discharged from the inflator part flows to the lower portion of the main chamber part, the upper portion of the main chamber part, and the protruding chamber part.

\* \* \* \* \*